United States Patent
Raines et al.

(10) Patent No.: US 6,808,274 B2
(45) Date of Patent: Oct. 26, 2004

(54) METHOD AND SYSTEM FOR DEPLOYING A MIRROR ASSEMBLY FROM A RECESSED POSITION

(75) Inventors: Aaron T. Raines, Dallas, TX (US);
Todd A. Mendez, Carrollton, TX (US)

(73) Assignee: Raytheon Company, Waltham, MA (US)

( * ) Notice: Subject to any disclaimer, the term of this patent is extended or adjusted under 35 U.S.C. 154(b) by 59 days.

(21) Appl. No.: 10/162,797

(22) Filed: Jun. 4, 2002

(65) Prior Publication Data

US 2003/0223133 A1 Dec. 4, 2003

(51) Int. Cl.[7] ................................................. G02B 5/08
(52) U.S. Cl. ...................................................... 359/841
(58) Field of Search ............................... 359/841, 871, 359/872; 353/13

(56) References Cited

U.S. PATENT DOCUMENTS

| | | |
|---|---|---|
| 2,716,193 A | 8/1955 | Riolo .......................... 250/215 |
| 3,803,407 A | 4/1974 | Anderson ............. 250/213 VT |
| 3,887,273 A | 6/1975 | Griffiths ..................... 353/14 |
| 4,052,123 A | 10/1977 | Yamazaki et al. |
| 4,131,818 A | 12/1978 | Wilder |
| 4,527,861 A | 7/1985 | Van Duyn |
| 4,664,475 A | 5/1987 | Ferrer ........................ 350/174 |
| 4,740,780 A | 4/1988 | Brown et al. ................ 340/705 |
| 4,868,652 A | 9/1989 | Nutton ........................ 358/113 |
| 4,919,517 A | 4/1990 | Jost et al. |

(List continued on next page.)

FOREIGN PATENT DOCUMENTS

| | | | |
|---|---|---|---|
| DE | 26 33 067 A1 | 2/1978 | ............ G08G/1/16 |
| EP | 1131293 | 10/1968 | ........... G02B/27/10 |
| EP | 0 312 094 A2 | 4/1989 | ........... G02B/27/00 |
| EP | 0 321 149 A1 | 6/1989 | ........... G02B/27/00 |
| EP | 0 515 328 A1 | 11/1992 | ........... G02B/27/00 |
| EP | 0 596 729 A2 | 5/1994 | |
| EP | 0 643 315 A1 | 3/1995 | ........... G02B/27/01 |
| EP | 0 710 866 A1 | 5/1996 | ........... G02B/27/01 |
| EP | 0 742 460 A2 | 11/1996 | ........... G02B/27/01 |
| EP | 0 818 701 A2 | 1/1998 | |
| EP | 0 859 413 A2 | 8/1998 | |
| EP | 1 076 255 A2 | 4/2000 | ........... G02B/27/01 |
| FR | 2 693 807 | 1/1994 | ........... G02B/27/18 |
| GB | 1 584 573 | 2/1981 | ........... B64D/43/00 |
| GB | 2179716 A | 3/1987 | ........... G02B/27/10 |
| GB | 2 246 900 A | 2/1992 | ........... G09F/19/18 |
| JP | 09185012 | 7/1997 | |
| JP | 2000280823 | 10/2000 | |
| WO | WO 89/03059 | 4/1989 | ........... G02B/27/00 |
| WO | WO 98/28602 | 7/1998 | ............. G01J/5/62 |
| WO | WO 99/33684 | 7/1999 | ............. B60R/1/00 |
| WO | WO 01/63232 A1 | 8/2001 | |
| WO | WO 02/31439 A2 | 4/2002 | |

OTHER PUBLICATIONS

PCT International Search Report dated Nov. 10, 2001 for PCT/US01/31952 dated Jun. 26, 2002.
PCT International Search Report dated May 30, 2003 for PCT/US03/17122, dated Sep. 15, 2003.
PCT Notification of Transmittal of the International Search Report or the Declaration, mailed Oct. 20, 2003, including International Search Report re PCT/US 03/17197 (8pgs).

(List continued on next page.)

Primary Examiner—Euncha P. Cherry
(74) Attorney, Agent, or Firm—Baker Botts L.L.P.

(57) ABSTRACT

There is disclosed a method and apparatus for deploying a mirror assembly from a recessed position that includes rotating the mirror assembly in a first direction about a first axis, the mirror assembly coupled proximate the first axis to at least one lifting arm and rotating each lifting arm in a second direction about a second axis such that the mirror assembly moves to an operational position. The first direction may be opposite from the second direction.

6 Claims, 6 Drawing Sheets

U.S. PATENT DOCUMENTS

| | | | |
|---|---|---|---|
| 4,934,771 A | 6/1990 | Rogers | |
| 4,961,625 A | 10/1990 | Wood et al. | |
| 4,970,653 A | 11/1990 | Kenue | |
| 5,001,558 A | 3/1991 | Burley et al. | 358/113 |
| 5,013,135 A | 5/1991 | Yamamura | |
| 5,023,451 A | 6/1991 | Burley | 250/330 |
| 5,028,119 A | 7/1991 | Hegg et al. | |
| 5,056,890 A | 10/1991 | Iino et al. | 359/630 |
| 5,237,455 A | 8/1993 | Bordo et al. | 359/632 |
| 5,289,312 A | 2/1994 | Hashimoto et al. | 359/487 |
| 5,289,315 A | 2/1994 | Makita et al. | |
| 5,299,062 A | 3/1994 | Ogata | 359/571 |
| 5,361,165 A | 11/1994 | Stringfellow et al. | |
| 5,414,439 A | 5/1995 | Groves et al. | 345/7 |
| 5,497,271 A | 3/1996 | Mulvanny et al. | 359/631 |
| 5,504,622 A | 4/1996 | Oikawa et al. | |
| 5,506,595 A | 4/1996 | Fukano et al. | |
| 5,657,163 A | 8/1997 | Wu et al. | 359/630 |
| 5,686,957 A | 11/1997 | Baker | 348/36 |
| 5,729,016 A | 3/1998 | Klapper et al. | 250/334 |
| 5,731,903 A | 3/1998 | Cook | |
| 5,734,357 A | 3/1998 | Matsumoto | |
| 5,739,848 A | 4/1998 | Shimoura et al. | 348/119 |
| 5,748,377 A | 5/1998 | Matsumoto et al. | 359/633 |
| 5,781,243 A | 7/1998 | Kormos | 348/556 |
| 5,805,119 A | 9/1998 | Erskine et al. | 345/7 |
| 5,859,714 A | 1/1999 | Nakazawa et al. | 359/13 |
| 5,864,432 A | 1/1999 | Deter | 359/634 |
| 5,867,133 A | 2/1999 | Toffolo et al. | 345/7 |
| 5,973,827 A | 10/1999 | Chipper | 359/356 |
| 6,014,259 A | 1/2000 | Wohlstadter | 359/619 |
| 6,072,444 A | 6/2000 | Burns | 713/201 |
| 6,100,943 A | 8/2000 | Koide et al. | 349/11 |
| 6,262,848 B1 | 7/2001 | Anderson et al. | 359/630 |
| 6,343,863 B1 * | 2/2002 | Wood | 353/13 |
| 6,359,737 B1 | 3/2002 | Stringfellow | |
| 6,392,812 B1 | 5/2002 | Howard | 359/633 |
| 2002/0005999 A1 | 1/2002 | Hutzel et al. | |
| 2002/0063778 A1 | 5/2002 | Kormos | |

OTHER PUBLICATIONS

Fresnel Optics, Inc., Product Overview, Cover plus 7 pages, date unknown.

Scott, Luke, and D'Agostino, John, "*NVEOD FLIR92 Thermal Imaging Systems Performance Model*", 10 pages, date unknown.

RCA Electro–Optics Handbook, "*Detection, Resolution and Recognition*", 2 Cover Pages, Foreward, plus pp. 118–121, 1974.

Smith, Warren J., "*Modern Optical Engineering, The Design of Optical Systems*", Inside and Outside Cover plus pp. 104–109, McGraw–Hill Book Co., 1966.

U.S. Army Night Vision and Electronic Sensors Directorate, Visionics & Image Signal Processing Division, Fort Belvoir, VA, "*FLIR Thermal Imaging Systems Performance Model*", Analyst's Reference Guide Document RG5008993, Jan. 1993, 21 pages.

Holst, Gerald C., "*Testing and Evaluation of Infrared Imaging Systems*", JCD Publishing Co., 3 Cover Pages, and pp. 308–343, 1993.

Richards, Oscar W., "Visual Needs and Possibilities for Night Automobile Driving", American Optical Corporation, Southbridge, Massachusetts, 08/67, two cover pages, pp. i, iii, v, vii, ix, xi, 1–36, 38–66, and 124–128.

U.S. patent application Ser. No. 09/558,700, filed Apr. 25, 2000, entitled "Method and Apparatus for Obtaining Infrared Images in a Night Vision System", by Alexander L. Kormos, 30 pages of text and 3 pages of drawings.

U.S. Ser. No. 09/747,035, filed Dec. 21, 2000, entitled "Method and Apparatus for Reducing Distortion in a Displayed Image", by Douglas W. Anderson, 18 pages of text and 2 pages of drawings.

U.S. Ser. No. 09/930,369, filed Aug. 15, 2001, entitled "Method and Apparatus for Displaying Information with a Head–Up Display", by Alexander L. Kormos, et al, 32 pages of text and 5 pages of drawings.

U.S. Ser. No. 09/972,543, filed Oct. 8, 2001, entitled "System and Method for forming Images for Display in a Vehicle", by Alexander L. Kormos, 39 pages of text and 4 pages of drawings.

U.S. Ser. No. 10/038,988, filed Jan. 4, 2002, entitled "System and Method for providing Images for an Operator of a Vehicle", by Alexander L. Kormos, 28 pages of text and 3 pages of drawings.

U.S. Ser. No. 10/163,343, filed Jun. 5, 2002, entitled "Method and System for Displaying and Image", by Alexander L. Kormos, 28 pages of text and 3 pages of drawings.

PCT International Search Report dated Jun. 26, 2002 for PCT/US 01/31952.

* cited by examiner

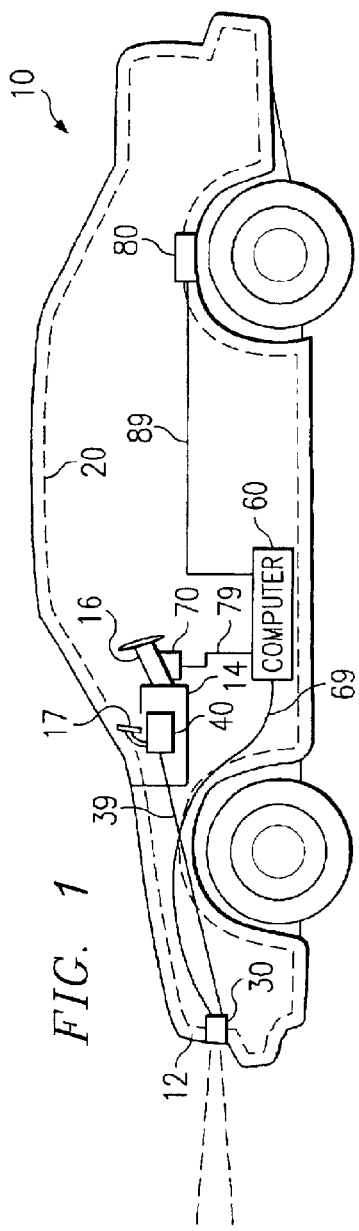
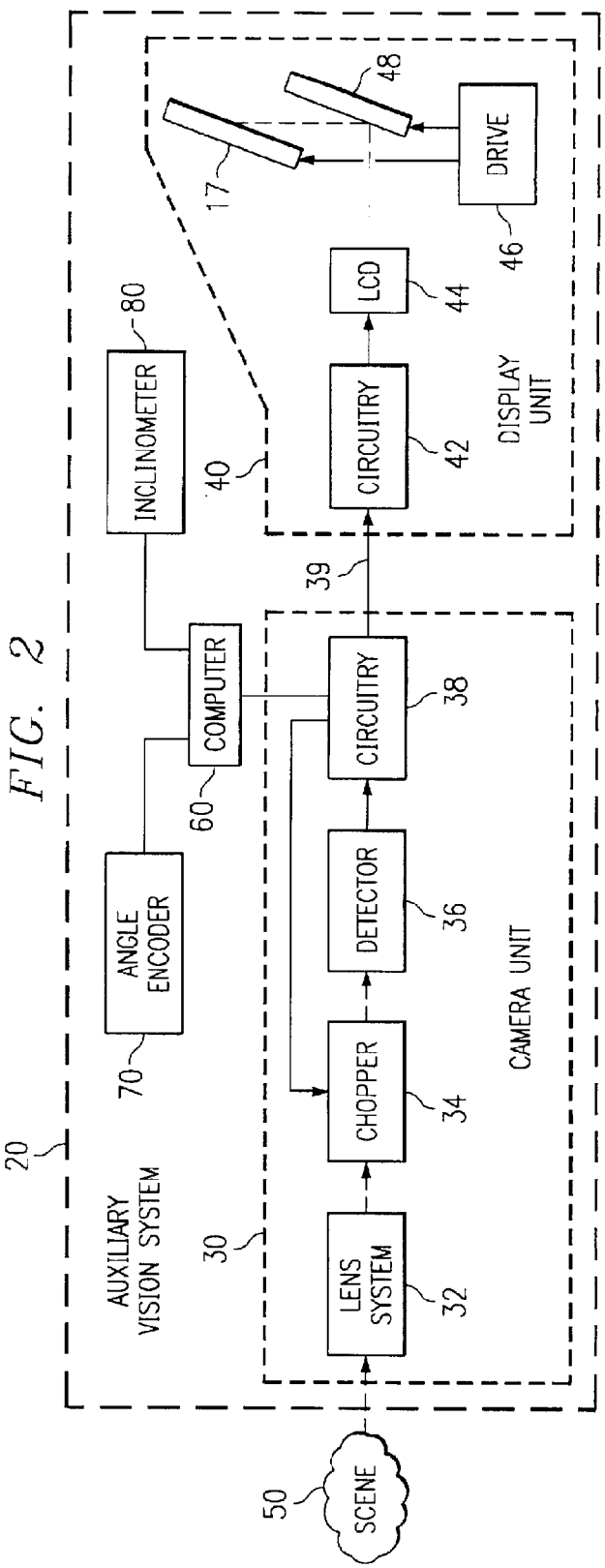

METHOD AND SYSTEM FOR DEPLOYING A MIRROR ASSEMBLY FROM A RECESSED POSITION

TECHNICAL FIELD OF THE INVENTION

This invention relates generally to mirror display systems and, more particularly, to a method and system for deploying a mirror assembly from a recessed position.

BACKGROUND OF THE INVENTION

During daylight hours, the driver of a vehicle is able to readily detect and recognize objects that would be difficult or impossible to detect or recognize at night. For example, assume that a deer wanders into the road approximately 500 meters ahead of the vehicle. If this scenario occurs in the middle of a sunny day, the driver will not only be able to detect the fact that something is present ahead, but will readily recognize that it is a deer. On the other hand, if this same scenario occurs at night, particularly when the only illumination is from the headlights of the vehicle, the driver will not be able to detect that anything is there, much less recognize that it is a deer, because the deer will be beyond the range of the headlights. Moreover, by the time the driver does detect that something is in the road, and well before the driver can recognize what it is, the driver will be much closer to the deer than would be the case during daylight hours. Accordingly, the risk of a resulting accident is much higher at night than during the day.

Consequently, in order to supplement the natural vision of a driver, and thus reduce the risk of accidents, night vision systems have been developed for vehicles, including automobiles sold in the consumer market. Typical night vision systems include an infrared camera unit, which gathers information regarding the scene in front of the vehicle, mounted in the grill of the vehicle and a head-up display, which projects an image derived from information provided by the camera unit onto an imaging mirror for view by the driver of the vehicle.

SUMMARY OF THE INVENTION

The present invention provides a method and system for deploying a mirror assembly from a recessed position that substantially eliminates or reduces at least some of the disadvantages and problems associated with previous methods and systems.

In accordance with a particular embodiment of the present invention, a method for deploying a mirror assembly from a recessed position includes rotating the mirror assembly in a first direction about a first axis, the mirror assembly coupled proximate the first axis to at least one lifting arm and rotating each lifting arm in a second direction about a second axis such that the mirror assembly moves to an operational position. The first direction may be opposite from the second direction.

The method may also include directing energy from a scene toward a detector, receiving energy from a portion of the scene at each of a plurality of detector elements, converting the energy received at each detector element into information representative of the received energy and forming a visible image using the information representative of the received energy. The visible image may be projected onto a fold mirror and reflected to an imaging mirror of the mirror assembly.

In accordance with another embodiment, a system for deploying a mirror assembly from a recessed position includes a mirror assembly coupled proximate a first axis to at least one lifting arm. The mirror assembly is operable to rotate in a first direction about the first axis. Each lifting arm is operable to rotate in a second direction about a second axis such that the mirror assembly moves to an operational position. The first direction may be opposite from the second direction.

The system may also include a lens system operable to direct energy from a scene toward a detector and a display unit coupled to the detector. The display unit is operable to form a visible image using information received from the detector. The detector may include an array of detector elements each operable to receive energy from a portion of the scene and to convert the received energy into information representative of the received energy and to send the information associated with at least some of the detector elements to the display unit. The display unit may comprise a liquid crystal display operable to project the visible image onto a fold mirror, wherein the fold mirror is configured to reflect the visible image to an imaging mirror of the mirror assembly.

Technical advantages of particular embodiments of the present invention include a mirror assembly that deploys by rotating in a first direction so that there is enough clearance between an end of the mirror assembly and a cover surrounding the mirror assembly to avoid contact between the end and the cover when the mirror assembly rotates in a second direction into an operational position. In addition, the mirror assembly can be aesthetically and effectively integrated with a surrounding cover and dashboard of a vehicle while in its recessed and non-operational position. For example, gaps between the mirror assembly and surrounding cover may be sized to allow for small manufacturing variances in the size of components of the assembly while still small enough for cosmetic integration with the dashboard.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of particular embodiments of the invention and their advantages, reference is now made to the following descriptions, taken in conjunction with the accompanying drawings, in which:

FIG. 1 is a diagrammatic view of a vehicle that includes one embodiment of an auxiliary vision system in accordance with the present invention;

FIG. 2 is a diagrammatic view of the auxiliary vision system of FIG. 1, showing in more detail the internal structure of a camera unit and a display unit of the auxiliary vision system;

DETAILED DESCRIPTION OF THE INVENTION

Figure 3:
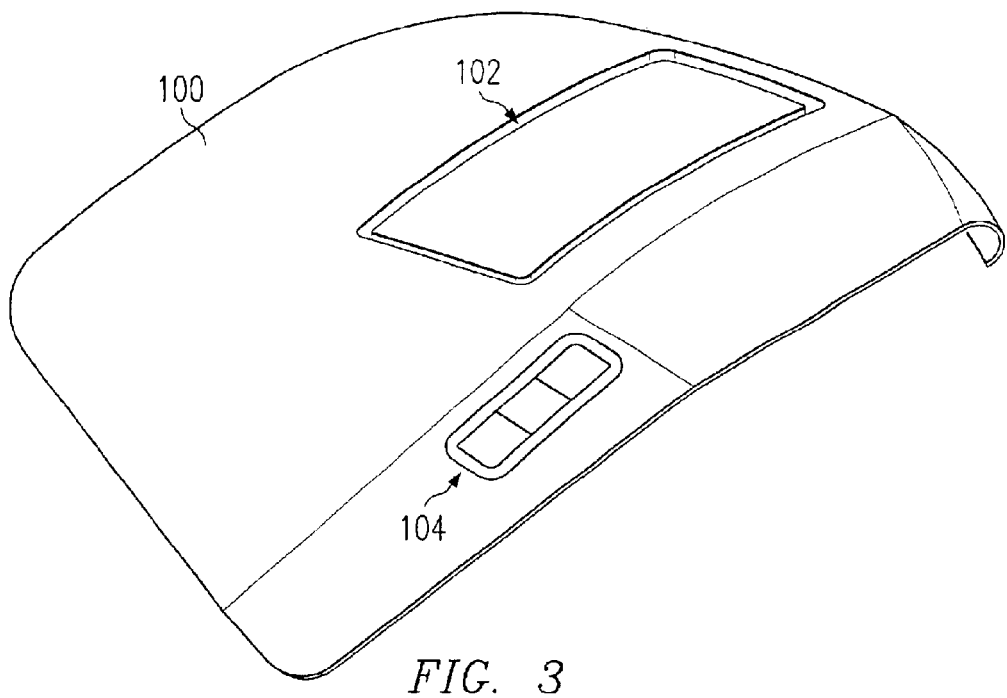
FIG. 3 is a diagrammatic view of a cover and mirror assembly of a display unit, in accordance with an embodiment of the present invention.

FIG. 1 is a diagrammatic view of a vehicle 10 incorporating one embodiment of an auxiliary vision system 20 in accordance with an embodiment of the present invention. The auxiliary vision system 20 includes a camera unit 30, which in the illustrated embodiment is mounted at the front of vehicle 10, in the middle of a front grill 12. The camera unit 30 is electrically coupled at 39 to a display unit 40, which is also a part of the auxiliary vision system 20. The display unit 40 is of a type that is commonly known as a head-up display (HUD). The display unit 40 is mounted within a recess of a dashboard 14 of the vehicle 10, and can project an image for reflection by a fold mirror of display unit 40 onto an imaging mirror 17 for display to the driver. Imaging mirror 17 is recessed within dashboard 14 when auxiliary vision system 20 is not in use. The imaging mirror 17 deploys out of dashboard 14 from a recessed position during operation of the system. As further described below, a rotation process is undertaken for deployment of imaging mirror 17 to an operational position. Such process allows the mirror to effectively deploy to an operational position from a recessed position in which the mirror is aesthetically and effectively integrated with the dashboard when the auxiliary vision system is not in use.

The camera unit 30 is also electrically coupled to a computer 60 at 69. The computer 60 is also part of the auxiliary vision system 20 and provides instructions to camera unit 30 based on heading information it receives from an angle encoder 70, which is coupled to a steering column 16 of vehicle 10 and electrically coupled to computer 60 at 79, and/or an inclinometer 80, which is coupled to the frame of vehicle 10 and electrically coupled to computer 60 at 89. Angle encoder 70 and inclinometer 80, which are two types of sensors, are also a part of auxiliary vision system 20. In general, any type of sensor that can provide information regarding the heading of vehicle 10, such as, for example, steering rate, inclination rate, and/or orientation, may be used in auxiliary vision system 20. Additionally, one, two, or even several sensors may be used in different embodiments. Particular embodiments, however, may not include an angle encoder or inclinometer. The auxiliary vision system 20 of FIG. 1 is discussed in more detail later.

When a driver is operating a vehicle at night, the driver's ability to see the road ahead is substantially more limited than would be case for the same section of road during daylight hours. This is particularly true in a rural area under conditions where there is little moonlight, there are no street lights, and there are no headlights of other vehicles. If an animal such as a deer happens to wander into the road at a location 500 meters ahead of the vehicle, the driver would readily notice and recognize the deer during daylight hours, whereas at night the deer may initially be beyond the effective reach of the illumination from the vehicle's headlights. Moreover, even when the headlights begin to illuminate the deer, the driver may not initially notice the deer, because the deer may be a brownish color that is difficult to distinguish from the surrounding darkness. Consequently, at the point in time when the driver first realizes that there is a deer in the road, the vehicle will be far closer to the deer in a nighttime situation than would be the case during daylight hours. There are many other similar high risk situations, for example, where a pedestrian is walking along the road.

A primary purpose of auxiliary vision system 20 of FIG. 1 is to provide the driver of the vehicle 10 with information above and beyond that which the driver can discern at night with the naked eye. In this regard, the camera unit 30 can detect infrared information at a distance well beyond the effective reach of the headlights of the vehicle 10. In the case of a life form such as an animal or a human, the heat signature of the life form, when presented in an infrared image derived from the camera unit 30, will usually have a significant contrast in comparison to the relatively hotter or cooler surrounding natural environment. As discussed above, this is not necessarily the case in a comparable nighttime image based on visible light.

Thus, in addition to the visible image that is directly observed by the driver through the windshield of the vehicle based on headlight illumination and any other available light, the auxiliary vision system 20 provides a separate and auxiliary image, based on infrared radiation, that is reflected onto imaging mirror 17. This auxiliary image can provide a detectable representation of lifeforms or objects ahead that are not yet visible to the naked eye. Further, the auxiliary image can provide a much more striking contrast than a visible image between the lifeforms or objects and the surrounding scene. Note that the auxiliary vision system 20 may also be useful during daylight hours to supplement the view of objects seen with natural light.

FIG. 2 is a diagrammatic view of the auxiliary vision system 20 of FIG. 1, showing in greater detail the internal structure of both the camera unit 30 and the display unit 40, in accordance with an embodiment of the present invention. More specifically, thermal radiation from a scene 50 enters the camera unit 30 and passes through a lens system 32 and a chopper 34 to a detector 36. The lens system 32 directs the incoming radiation onto an image plane of the detector 36.

In the disclosed embodiment, the chopper 34 is a rotating disk of a known type. As the chopper 34 is rotated, it modulates the incoming infrared radiation to the detector 36.

Also in the disclosed embodiment, the detector 36 is a commercially available focal plane array or staring array detector, which has a two-dimensional matrix of detector elements, where each detector element produces a respective pixel of a resulting image. In particular, detector 36 is an uncooled pyroelectric barium strontium titanate (BST) detector, although numerous other types of detectors would also be useful in auxiliary vision system 20.

The circuitry 38 is provided to control the detector 36 and read out the images that it detects, and also to synchronize the chopper 34 to operation of the detector 36. Further, based on information from computer 60, the circuitry 38 sends the information obtained from detector 36 through the electrical coupling 39 to the circuitry 42 within the display unit 40.

The circuitry 42 controls a liquid crystal display (LCD) 44, which in the disclosed embodiment has a two-dimensional array of pixel elements. The display unit 40 has a horizontal to vertical aspect ratio of 10:3.3. Other embodiments may include a display unit having a different horizontal to vertical aspect ratio. The circuitry 42 takes successive images obtained from the detector 36 through circuitry 38, and presents these on the LCD 44. The LCD 44 may include backlighting that makes the image on LCD 44 visible at night.

This visible image is projected onto a fold mirror 48 that reflects the image so as to be directed onto imaging mirror 17, creating a virtual image for the driver. Although fold mirror 48 and imaging mirror 17 are shown diagrammatically in FIG. 2 as planar components, each may have a relatively complex curvature that is known in the art. The curvature may also give the mirrors some optical power, so that they impart a degree of magnification to the image. Imaging mirror 17 is movably supported, and its position at any given time is determined by a drive mechanism 46. Using the drive mechanism 46, the driver may adjust the imaging mirror 17 so that it is in a viewing position comfortable for that particular driver. Once the driver has finished adjusting the imaging mirror to a suitable position, it remains in that position during normal operation of the auxiliary vision system 20.

FIG. 3 is a diagrammatic view of a cover 100 for the display unit 40 of auxiliary vision system 20 showing mirror assembly 102 in a recessed, non-operational position, in accordance with an embodiment of the present invention. When the display unit 40 of FIGS. 1 and 2 is installed in a vehicle, cover 100 is integrated with the dashboard of the vehicle. Cover 100 may comprise various shapes and configurations depending on the type of vehicle in which the display unit is installed. The driver of the vehicle may control the functions of the auxiliary vision system through controls 104. For example, using controls 104, the driver may power the auxiliary vision system on and off, position mirror assembly 102 and control the brightness of the image projected by the auxiliary vision system.

Figure 4:
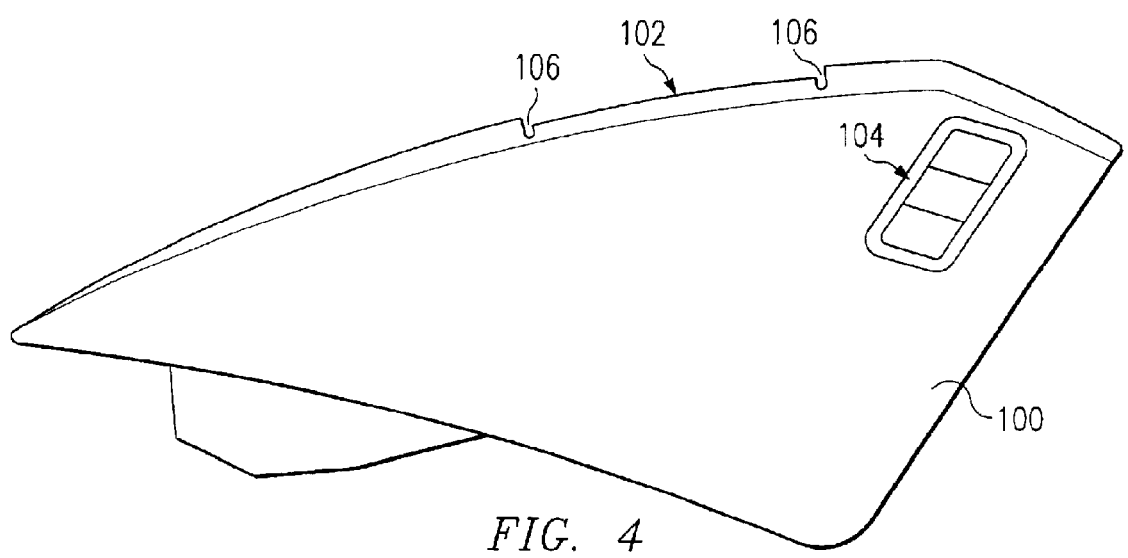
FIG. 4 is another diagrammatic view of the cover and mirror assembly of FIG. 3.

FIG. 4 is another diagrammatic view of cover 100 showing mirror assembly 102 in a recessed, non-operational position, in accordance with an embodiment of the present invention. Gaps 106 are illustrated between the edges of cover 100 and mirror assembly 102. Gaps 106 are sized such that mirror assembly 102 has enough space to deploy when the auxiliary vision system is in use and to allow for small manufacturing variances in the size of components of the auxiliary vision system. It is also desired that the size of gaps 106 are kept small enough for cosmetic integration with cover 100 and the dashboard of the vehicle. In particular embodiments, gaps 106 are sized such that the distance between the edges of cover 100 and mirror assembly 102 is approximately 1.5 to 2 millimeters.

Figure 5A:
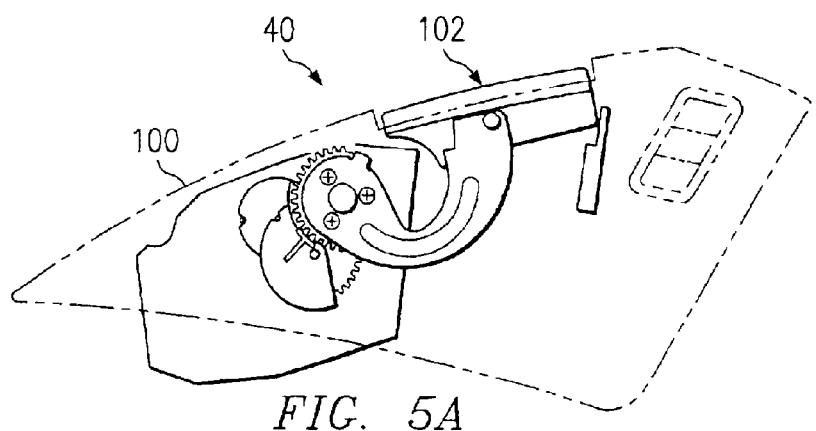
FIGS. 5a–5e are diagrammatic views of a display unit illustrating the deployment of a mirror assembly from a recessed position, in accordance with an embodiment of the present invention.

FIGS. 5a–5e are diagrammatic views of display unit 40 illustrating the deployment of mirror assembly 102 from a recessed position, in accordance with an embodiment of the present invention. FIG. 5a illustrates mirror assembly 102 in a recessed, non-operational position.

Figure 5B:
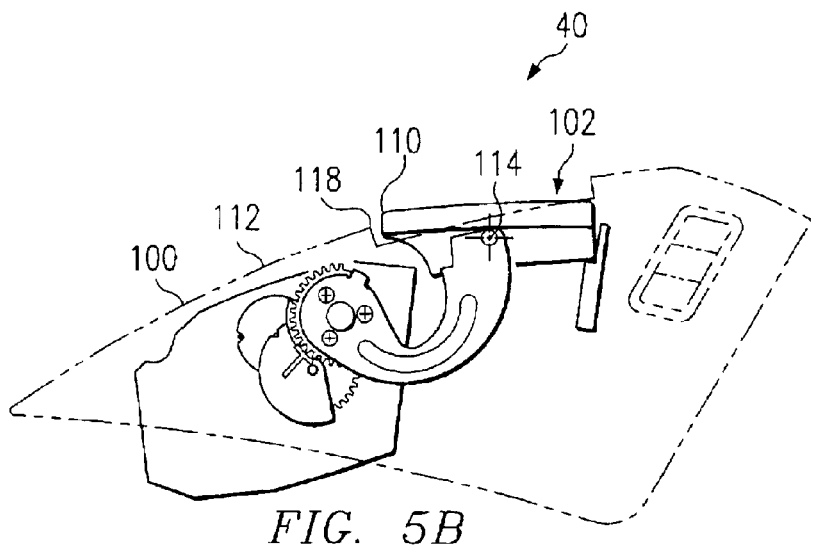

In FIG. 5b, the deployment of mirror assembly 102 begins as an end 110 of mirror assembly 102 lifts relative to surface 112 of cover 100. End 110 lifts as a result of a slight rotation of mirror assembly 102 about a pivot axis represented by crosshair 114. In effect, mirror assembly slightly rotates about an end of lifting arm 136. From the illustrated view of FIG. 5b, such rotation is in a clockwise direction. In this embodiment, the rotation is caused by bias springs pushing against mirror assembly 102 as further discussed below with respect to FIG. 6; however, in other embodiments other suitable techniques may be used to cause this rotation of mirror assembly 102 about an end of lifting arm 136 during deployment. The lifting of end 110 provides enough clearance between end 110 of mirror assembly 102 and an edge 118 of cover 102 to allow for mirror assembly 102 to fully deploy from a recessed position, as described below.

Figure 5C:
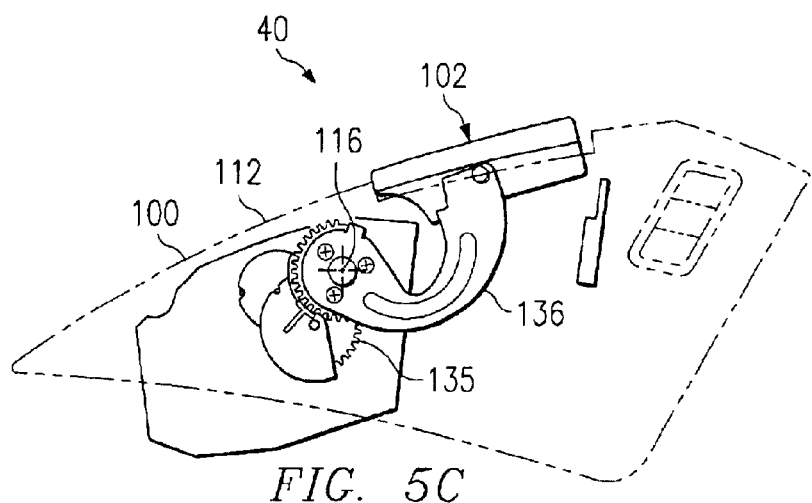

In FIG. 5c, mirror assembly 102 begins to rotate out and above surface 112 of cover 100. In this embodiment, this rotation is in an opposite direction from the rotation about the pivot axis represented by crosshair 114 discussed above with respect to FIG. 5b. Thus, from the illustrated view of FIG. 5c, this rotation is in a counterclockwise direction. This rotation occurs as lifting arm 136 coupled to mirror assembly 102 rotates about a pivot axis represented by crosshair 116. In this embodiment, such rotation of lifting arm 136 is provided by a gear mechanism 135. As stated above, without the rotation resulting in the lifting of end 110 as illustrated in FIG. 5b, there would not be enough clearance between mirror assembly 102 and edge 118 of cover 100 to avoid contact between end 110 of mirror assembly 102 and edge 118 during the rotation of lifting arm 136 illustrated in FIG. 5c.

Figure 5D:
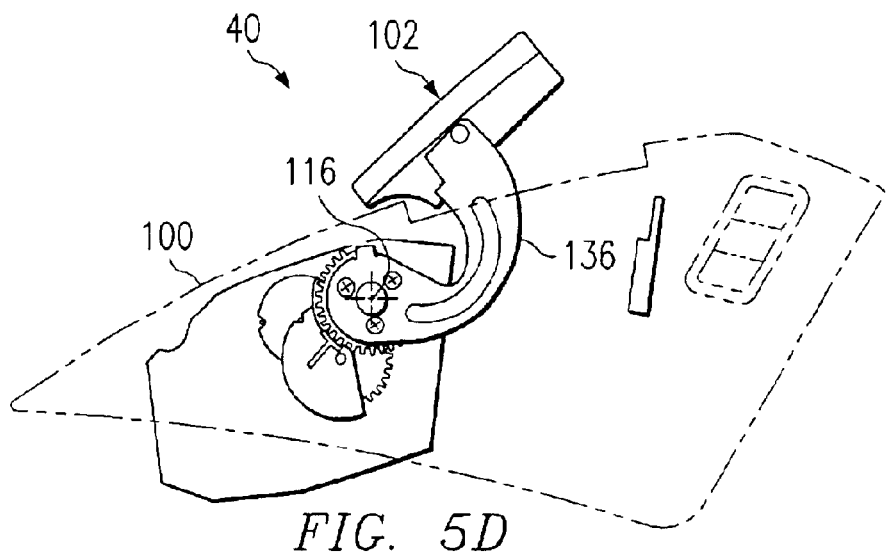
Figure 5E:
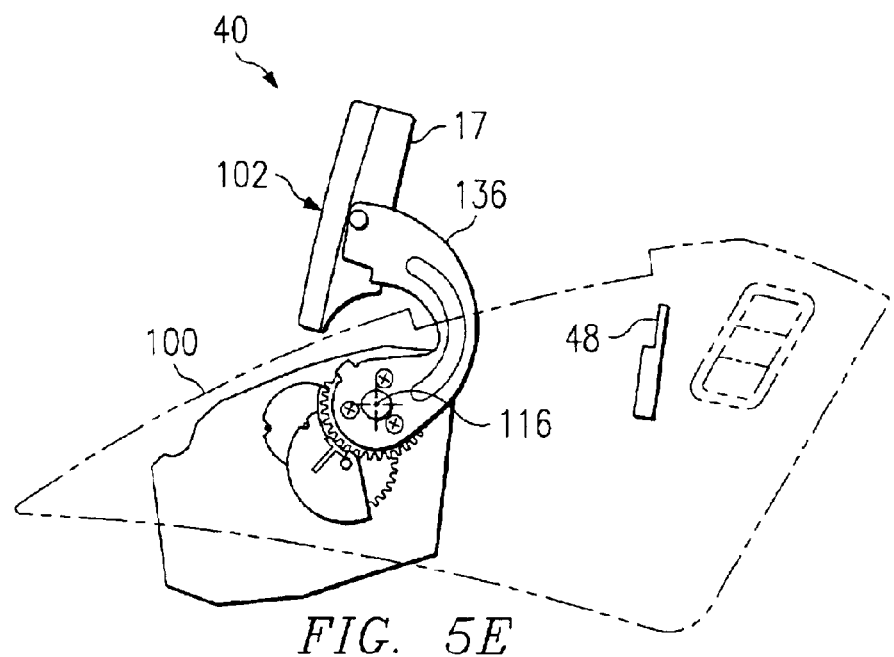

In FIG. 5d, the deployment of mirror assembly 102 continues as lifting arm 136 continues to rotate about the pivot axis represented by crosshair 116. FIG. 5e illustrates mirror assembly 102 in a fully deployed and operational position. During operation, fold mirror 48 reflects an image projected by an LCD onto imaging mirror 17 of mirror assembly 102.

Figure 6:
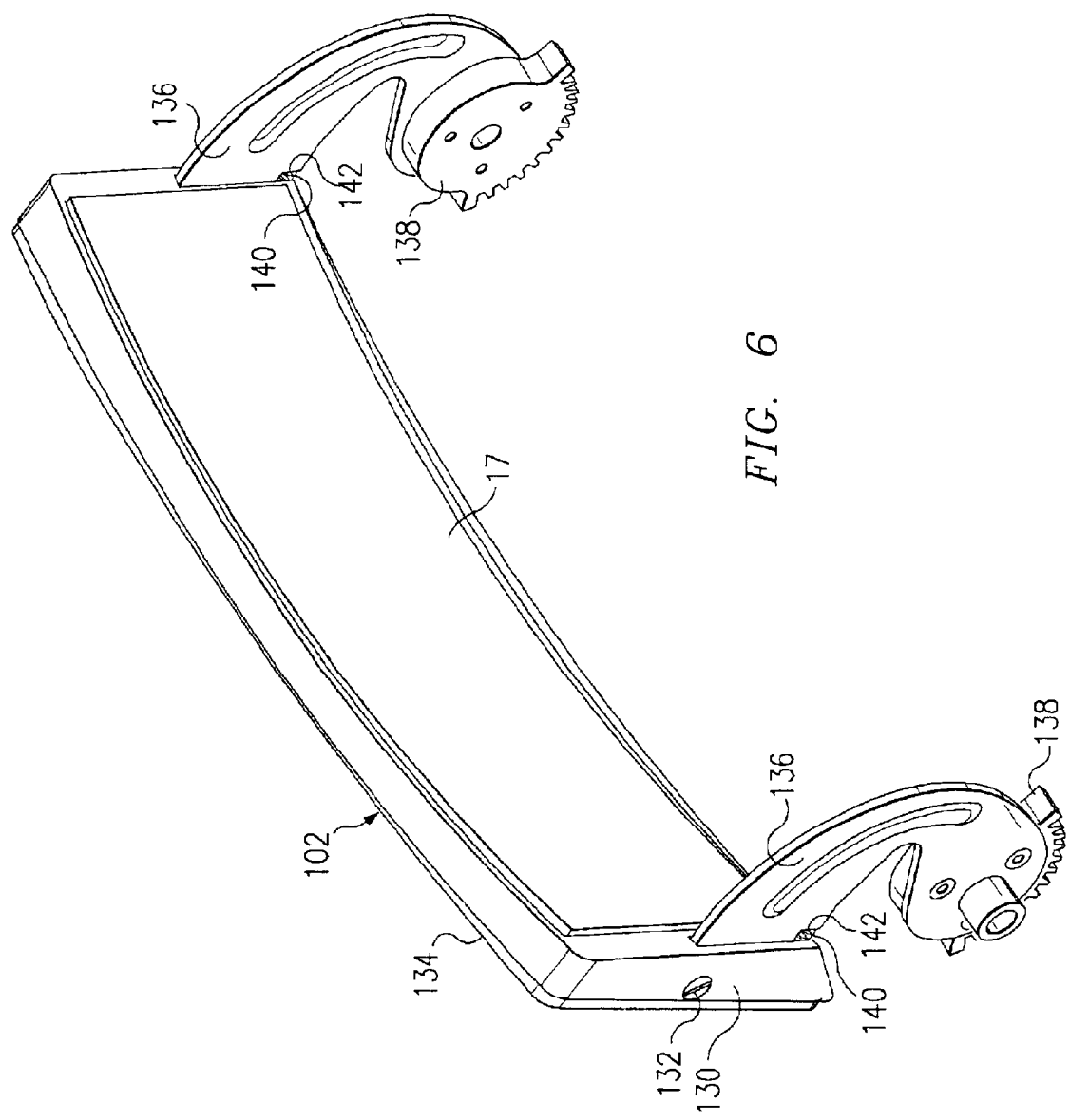
FIG. 6 is a diagrammatic view illustrating part of a display unit including a mirror assembly, in accordance with an embodiment of the present invention.

FIG. 6 is a diagrammatic view illustrating part of a display unit including a mirror assembly 102, in accordance with an embodiment of the present invention. Mirror assembly 102 includes a frame 130, an imaging mirror 17 and a mirror assembly cover 134. Frame 130 surrounds the edges of imaging mirror 17. In particular embodiments, frame 130 is approximately 200 millimeters wide and 110 millimeters high. Mirror assembly cover 134 covers the back side of imaging mirror 17. It should be understood that in particular embodiments, mirror assembly 102 may include a display screen, such as a liquid crystal display, for direct display of an image to the driver of a vehicle without a reflection off a fold mirror.

Frame 130 is coupled to lifting arms 136 by coupling members 132. Coupling members 132 may comprise shoulder bolts or any other suitable components configured to couple frame 130 to lifting arms 136. In this embodiment, coupling members 132 comprise shoulder bolts that tighten against frame 130 and rotate freely within lifting arms 136 to allow mirror assembly 102 to rotate about the ends of lifting arms 136. As shown, the frame 130 is coupled to two lifting arms 136; however, in other embodiments frame 130 may be coupled to one or more than two lifting arms.

Bias springs 140 are located between frame 130 and a notch 142 of lifting arms 136. Bias springs 140 push frame 130 away from notch 142 of lifting arms 136 to provide for the rotation of the mirror assembly about the end of lifting arm 136 during deployment described above with respect to FIG. 5b.

As illustrated, lifting arms 136 are coupled to gears 138. The gears 138 rotate lifting arms 136 which provides for the rotation of mirror assembly 102 to a fully deployed and operational position as described above with respect to FIGS. 5c–5e.

Figure 7:
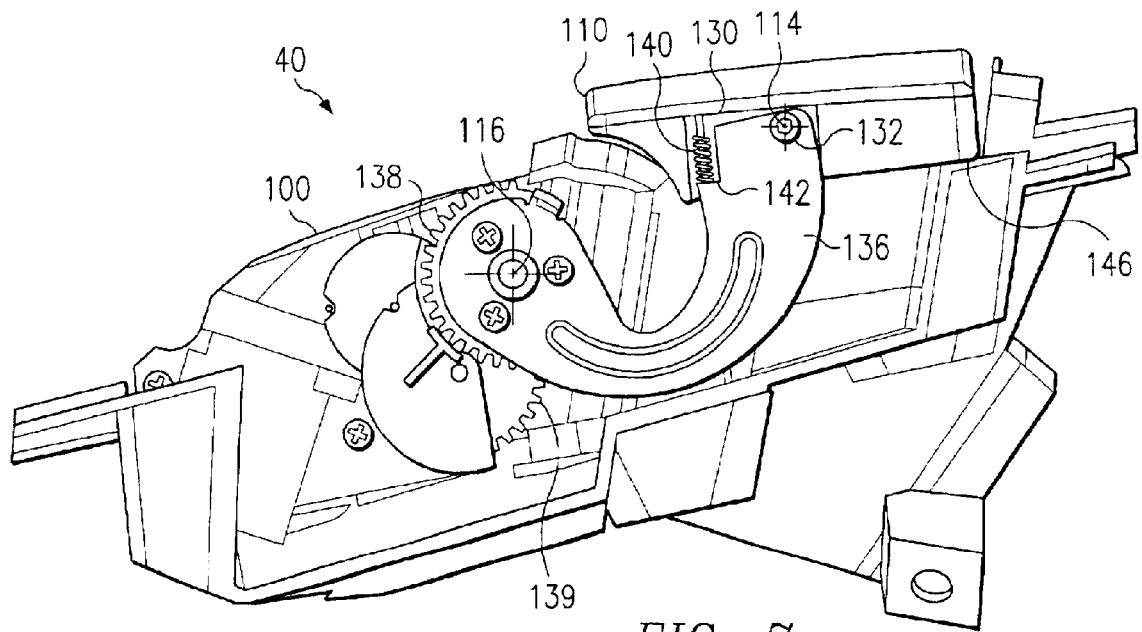
FIG. 7 is a diagrammatic view illustrating a display unit with a mirror assembly partially deployed, in accordance with an embodiment of the present invention.

FIG. 7 is a diagrammatic view illustrating display unit 40 with mirror assembly 102 partially deployed after the rotation and lifting of end 110. As described above with respect to FIG. 5b, such rotation occurs about a pivot axis represented by crosshair 114. This pivot axis is located at coupling members 132 and the pivoting action is caused by bias springs 140 pushing frame 130 away from notch 142 of lifting arms 136. When mirror assembly is in a retracted, or recessed, position, as illustrated in FIG. 5a, bias springs 140 are compressed as a result of a force applied to mirror assembly 102 by the contact of a stop feature 146 of display unit 40 with mirror assembly 102. After end 110 has lifted as a result of the rotation about the pivot axis represented by crosshair 114, mirror assembly 102 will have enough clearance to avoid contact with cover 100 during the rotation of lifting arms 136 by gears 138 about a pivot axis represented by crosshair 116. Gears 138 are rotated by drive gears 139 which are driven by a motor (hidden from view).

Figure 8:
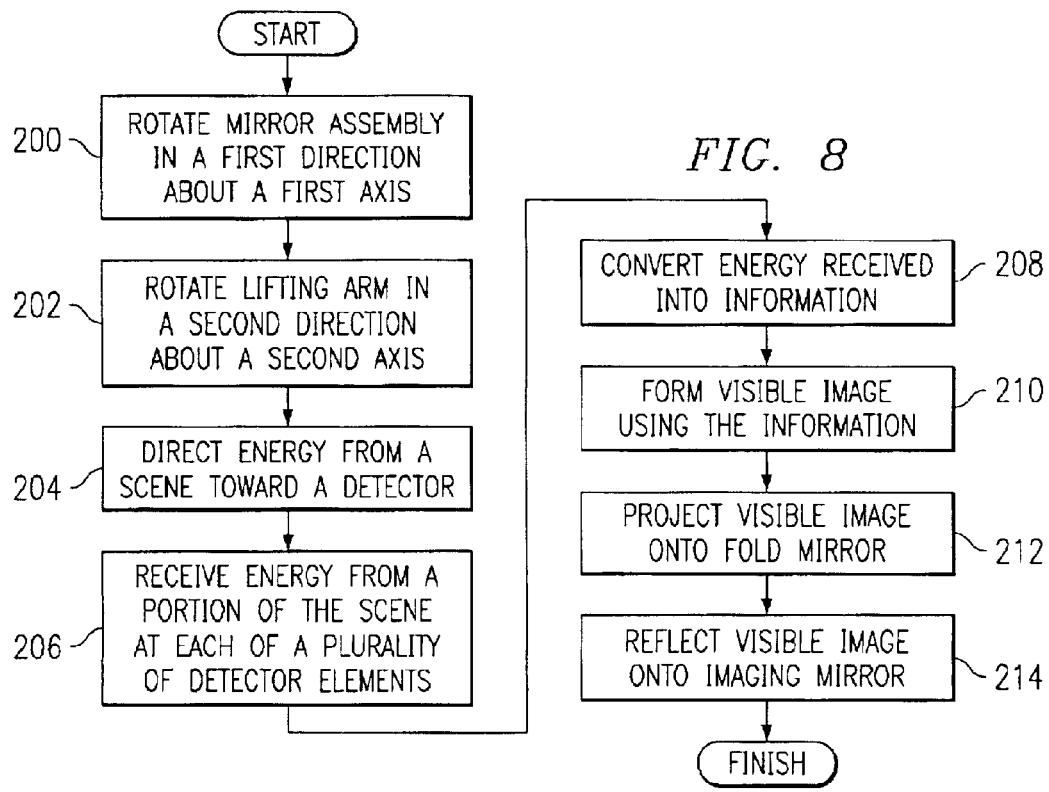
FIG. 8 is a flowchart illustrating a method for deploying a mirror assembly from a recessed position, in accordance with an embodiment of the present invention.

FIG. 8 is a flowchart illustrating a method for deploying the mirror assembly 102, in accordance with an embodiment of the present invention. The method begins at step 200 where the mirror assembly 102 is rotated in a first direction about a first axis (crosshair 114) from a recessed position. In the recessed position, the mirror assembly is recessed within a cover 100 that may be integrated with a dashboard of a vehicle. The mirror assembly 102 may be coupled proximate the first axis to at least one lifting arm 136. The rotation of the mirror assembly about the first axis may result from one or more bias springs 140 pushing on a frame 130 of the mirror assembly to lift an end 110 of the mirror assembly. This lifting of an end of the mirror assembly provides sufficient clearance to avoid contact between the mirror assembly and the cover during the rotation of the mirror assembly discussed below at step 202.

At step 202, each lifting arm 136 is rotated in a second direction about a second axis (crosshair 116) such that the mirror assembly 102 moves to an operational position. In particular embodiments the second direction of rotation may be opposite the first direction of rotation. Moreover, the rotation described in step 202 may occur simultaneous with the rotation described in step 200.

The method continues at step 204 where energy from a scene 50 is directed towards a detector 36. At step 206, energy from a portion of the scene is received at each of a plurality of detector elements. At step 208, the energy received at each detector element is converted into information representative of the energy received at step 206. At step 210, a visible image is formed using the information representative of the received energy. The visibly image is projected onto a fold mirror 48 at step 212. Such projection may occur by a liquid crystal display (LCD). At step 214, the visible image is reflected by the fold mirror 48 onto an imaging mirror 17 of the mirror assembly 102 for view by the driver of a vehicle. Through the visible image, the driver may detect lifeforms or objects ahead that are not yet visible to the naked eye.

It should be understood that particular embodiments may include a mirror assembly deployed as described herein that displays an image other than an image detected by a camera unit mounted in the grill of a car. For example, in particular embodiments, the mirror assembly may display navigation information, dashboard information or any other information or image, such as an image from any video input.

Particular embodiments of the present invention provide a mirror assembly that deploys by rotating in a first direction so that there is enough clearance between an end of the mirror assembly and a cover surrounding the mirror assembly to avoid contact between the end and the cover when the mirror assembly rotates in a second direction into an operational position. In addition, the mirror assembly can be aesthetically and effectively integrated with a surrounding cover and dashboard of a vehicle while in its recessed and non-operational position. For example, gaps between the mirror assembly and surrounding cover may be sized to allow for small manufacturing variances in the size of components of the assembly while still small enough for cosmetic integration with the dashboard.

Although the present invention has been described in detail, various changes and modifications may be suggested to one skilled in the art. It is intended that the present invention encompass such changes and modifications as falling within the scope of the appended claims.

What is claimed is:

1. A method for projecting an image, comprising:
rotating a mirror assembly recessed within a dash of an automobile in a first direction about a first axis, the mirror assembly coupled proximate the first axis to at least one lifting arm;
rotating each lifting arm in a second direction about a second axis such that the mirror assembly moves to an operational position that is not recessed within a dash of an automobile; and
reflecting a visible image onto an imaging mirror of the mirror assembly.

2. A method for projecting an image, comprising:
rotating a mirror assembly recessed within, and having a surface substantially flush with a surface of, a dash of an automobile in a first direction about a first axis, the mirror assembly coupled proximate the first axis to at least one lifting arm;
rotating each lifting arm in a second direction about a second axis such that the mirror assembly moves to an operational position that is not recessed within a dash of an automobile;
directing energy from a scene toward a detector;
receiving energy from a portion of the scene at each of a plurality of detector elements;
converting the energy received at each detector element into information representative of the received energy; and
forming a visible image using the information representative of the received energy.

3. The method of claim 2, further comprising projecting the visible image onto a fold mirror and reflecting the visible image to an imaging mirror of the mirror assembly using the fold mirror.

4. A system for projecting an image, comprising:
a mirror assembly recessed within a dash of an automobile and coupled proximate a first axis to at least one lifting arm, the mirror assembly operable to rotate in a first direction about the first axis;
wherein each lifting arm operates to rotate in a second direction about a second axis such that the mirror assembly moves to an operational position that is not recessed within a dash of an automobile; and
a fold member operable to reflect a visible image onto an imaging mirror of the mirror assembly.

5. A system for projecting an image, comprising:
a minor assembly recessed within a dash of an automobile and coupled proximate a first axis to at least one lifting arm, the mirror assembly operable to rotate in a first direction about the first axis;
wherein each lifting arm operates to rotate in a second direction about a second axis such that the minor assembly moves to an operational position that is not recessed within a dash of an automobile;
a lens system operable to direct energy from a scene toward a detector;
a display unit coupled to the detector, the display unit operable to form a visible image using information received from the detector; and wherein the detector includes an array of detector elements, each detector element operable to receive energy from a portion of the scene and to convert the received energy into information representative of the received energy and to send the information associated with at least some of the detector elements to the display unit.

6. The system of claim 5, wherein the display unit comprises a liquid crystal display operable to project the visible image onto a fold minor, the fold minor configured to reflect the visible image to an imaging mirror of the mirror assembly.

* * * * *